(12) United States Patent
Wiencke et al.

(10) Patent No.: US 9,348,558 B2
(45) Date of Patent: May 24, 2016

(54) PROCESSOR WITH EFFICIENT ARITHMETIC UNITS

(71) Applicant: TEXAS INSTRUMENTS DEUTSCHLAND GMBH, Freising (DE)

(72) Inventors: Christian Wiencke, Garching (DE); Armin Stingl, Erding (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 286 days.

(21) Appl. No.: 13/974,908

(22) Filed: Aug. 23, 2013

(65) Prior Publication Data

US 2015/0058391 A1 Feb. 26, 2015

(51) Int. Cl.
*G06F 7/53* (2006.01)
(52) U.S. Cl.
CPC .................................. *G06F 7/5324* (2013.01)
(58) Field of Classification Search
USPC .......................................... 708/523, 490, 501
See application file for complete search history.

(56) References Cited

U.S. PATENT DOCUMENTS

| | | | | | |
|---|---|---|---|---|---|
| 5,153,848 | A | * | 10/1992 | Elkind | G06F 7/483 708/503 |
| 5,179,531 | A | * | 1/1993 | Yamaki | G06F 7/552 708/446 |
| 5,517,436 | A | * | 5/1996 | Andreas | G06F 7/5443 708/523 |
| 5,778,241 | A | * | 7/1998 | Bindloss | G06F 9/30014 712/20 |
| 5,815,680 | A | * | 9/1998 | Okumura | G06F 9/30072 709/213 |
| 5,924,114 | A | * | 7/1999 | Maruyama | G06F 9/3552 711/110 |
| 2002/0002573 | A1 | * | 1/2002 | Landers | G06F 7/49 708/501 |
| 2003/0005269 | A1 | * | 1/2003 | Conner | G06F 9/30032 712/223 |

\* cited by examiner

*Primary Examiner* — Tan V. Mai
(74) *Attorney, Agent, or Firm* — John R. Pessetto; Frank D. Cimino

(57) ABSTRACT

A processor includes a carry save array multiplier. The carry save array multiplier includes an array of cascaded partial product generators. The array of cascaded partial product generators is configured to generate an output value as a product of two operands presented at inputs of the multiplier. The array of cascaded partial product generators is also configured to generate an output value as a sum of two operands presented at inputs of the multiplier.

5 Claims, 4 Drawing Sheets

PROCESSOR WITH EFFICIENT ARITHMETIC UNITS

BACKGROUND

Arithmetic operations are often performed by execution of a computer program. To facilitate such arithmetic operations, processors generally include circuitry that provides at least rudimentary arithmetic functionality. For example, processors typically include an arithmetic logic unit (ALU) that includes an adder for performing addition and subtraction operations. Many processors also include a hardware multiplier that can be used to multiply two values.

SUMMARY

A processor that includes efficient arithmetic units is disclosed herein. In one embodiment, a processor includes a carry save array multiplier. The carry save array multiplier includes an array of cascaded partial product generators. The array of cascaded partial product generators is configured to generate an output value as a product of two operands presented at inputs of the multiplier. The array of cascaded partial product generators is also configured to generate an output value as a sum of two operands presented at inputs of the multiplier.

In another embodiment, a carry save array multiplier includes an array of cascaded partial product generators configured to selectably generate as output of the multiplier either of a product of two multiplicands provided at inputs of the multiplier, and a sum of two addends provided at inputs of the multiplier.

In a further embodiment, a processor includes a multiplier, an arithmetic logic unit, and sequencing logic. The multiplier is configured to multiply two operands. The arithmetic logic unit is configured to sum two operands. The sequencing logic controls operation of the multiplier and the arithmetic logic unit during instruction execution. The sequencing logic is configured to, as part of execution of a multiply and accumulate instruction, add, in the arithmetic logic unit, a product value generated by the multiplier to an addend value provided to the arithmetic logic unit.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Because the applications to which processors are directed vary widely, different processors may include arithmetic circuitry tuned to facilitate the particular applications to which the processors are directed. For example, if a processor is directed to high performance arithmetic computation, then the processor may include circuitry intended to maximize arithmetic performance without regard for cost, energy consumption, programming complexity, etc. Conversely, a processor directed to providing basic control functionality may include circuitry providing only minimal arithmetic performance at the lowest possible cost. Many processors seek to provide a balance of performance and cost, where arithmetic performance is sufficient for applications to which the processor is targeted, and is provided at the lowest possible cost and/or energy consumption.

Embodiments of the present disclosure include arithmetic circuitry that provides multiplication performance that is similar to that of conventional hardware multipliers while advantageously reducing circuit area and cost. Embodiments also provide multiply and accumulate (MAC) functionality equivalent to conventional MAC units while reducing circuit complexity and cost.

Figure 1:
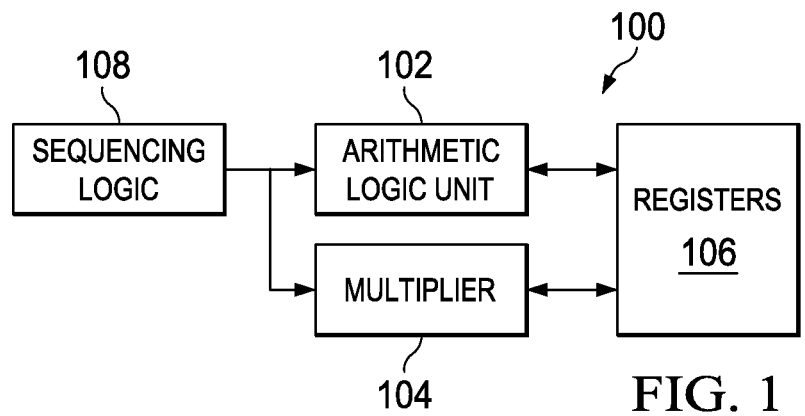
FIG. 1 shows a block diagram of a processor in accordance with various embodiments.

FIG. 1 shows a block diagram of a processor 100 in accordance with various embodiments. The processor 100 is an instruction execution device that includes circuitry that executes instructions read from memory. The instructions include arithmetic instructions that cause the processor 100 to perform arithmetic operations such as addition, subtraction, multiplication, multiplication and accumulation, etc.

To provide arithmetic operations, the processor 100 includes an arithmetic logic unit (ALU) 102, a multiplier 104, registers 106, and sequencing logic 108. The ALU 102 provides addition, subtraction, and logical functionality to the processor 100. The multiplier 104 provides multiplicative functionality. The registers 106 provide storage for values to be manipulated by the ALU 102 and/or the multiplier 104, and for results generated by the ALU 102 and/or the multiplier 104.

The multiplier 104 provides single precision results and double precision results. As used herein, a single precision result refers to a result of multiplication having the same width as the multiplicands, and a double precision result is twice the width of the single precision result. The multiplier 104 includes circuitry, a multiplication array, which performs multiplication operations. The outputs of a single precision multiplication operation of the multiplication array are a final single precision result and two temporary result vectors that can be added to generate the upper portion of the final double precision result.

The multiplier 104 also includes circuitry that allows the multiplication array to perform addition. As a result, the two temporary result vectors generated by single precision multiplication can be fed back into the inputs of the multiplication array to generate the upper portion of a double precision result using the multiplication array to perform addition. Accordingly, the multiplier 104 lacks the dedicated adder used to generate double precision results in conventional multipliers, and can therefore be manufactured at lower cost than the conventional multiplier.

The ALU 102 is coupled to the multiplier 104. In embodiments of the processor 100, the ALU 102 provides the adder used to perform accumulation. Thus, the processor 100 can omit an adder circuit dedicated to the execution of MAC instructions as is provided in conventional processors, which leads to a cost reduction relative to conventional processors with little or no performance degradation.

The sequencing logic 108 controls the operation of the ALU 102, the multiplier 104, and the registers 106 in accordance with the instruction being executed. For example, when executing a multiplication instruction, the sequencing logic 108 provides control information that directs the operation of the multiplier 104, selects registers of the registers 106 containing values to be multiplied, and controls routing of data (operands and results) between the registers 106 and the multiplier 104. When execution of an instruction requires sequential operation of the multiplier 104 and/or the ALU 102, e.g., a MAC instruction or double precision multiplication, the sequencing logic 108 provides the appropriate control and data routing.

The processor 100 may also include various other components that have been omitted from FIG. 1 as a matter of brevity. For example, the processor 100 may also include instruction/data fetch logic, instruction decoding logic, additional execution units, memories, and peripheral circuitry such as timers, communication subsystems, interrupt logic, etc.

Figure 2A:
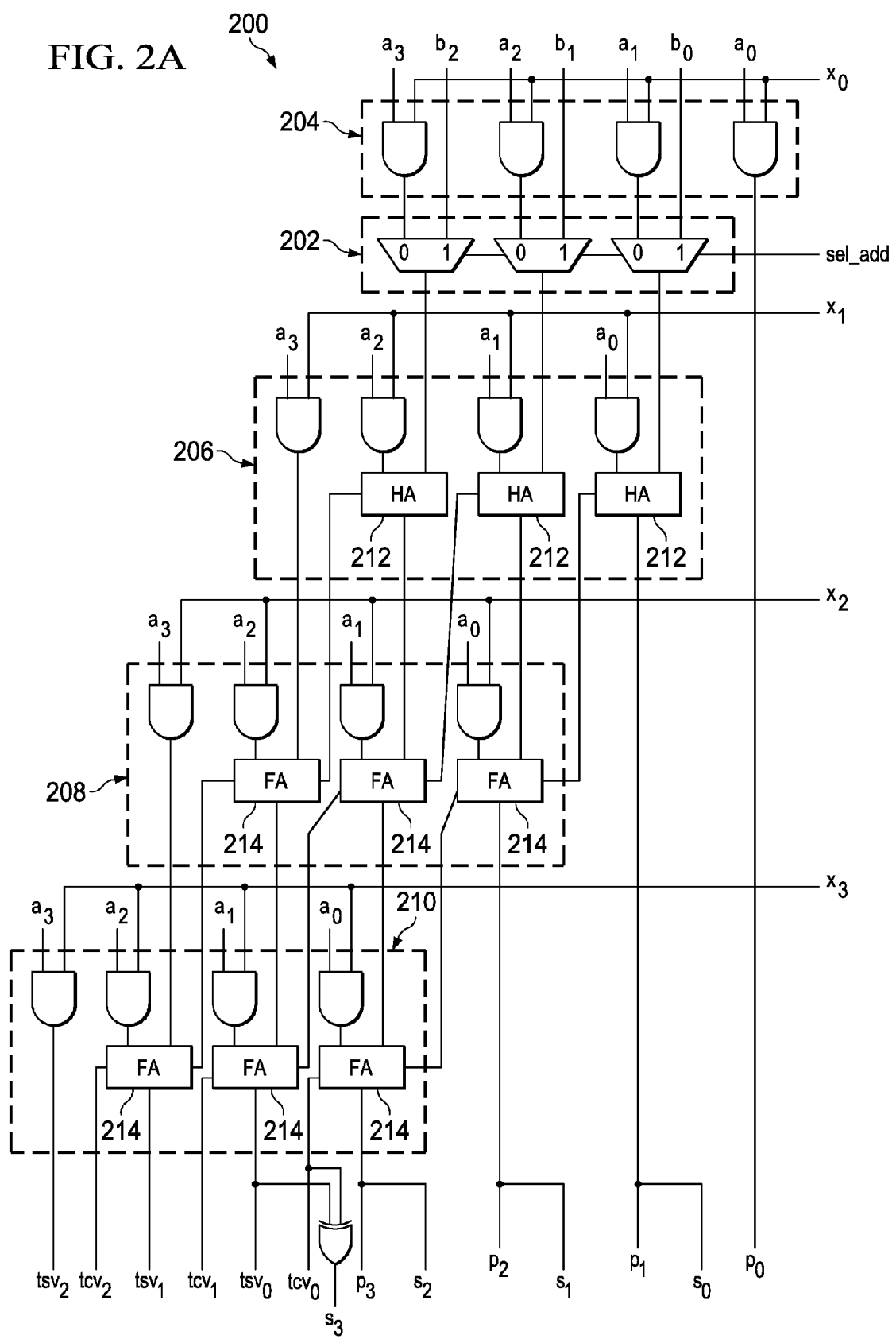
FIGS. 2A and 2B shows block diagrams of carry save array multipliers in accordance with various embodiments.
Figure 2B:
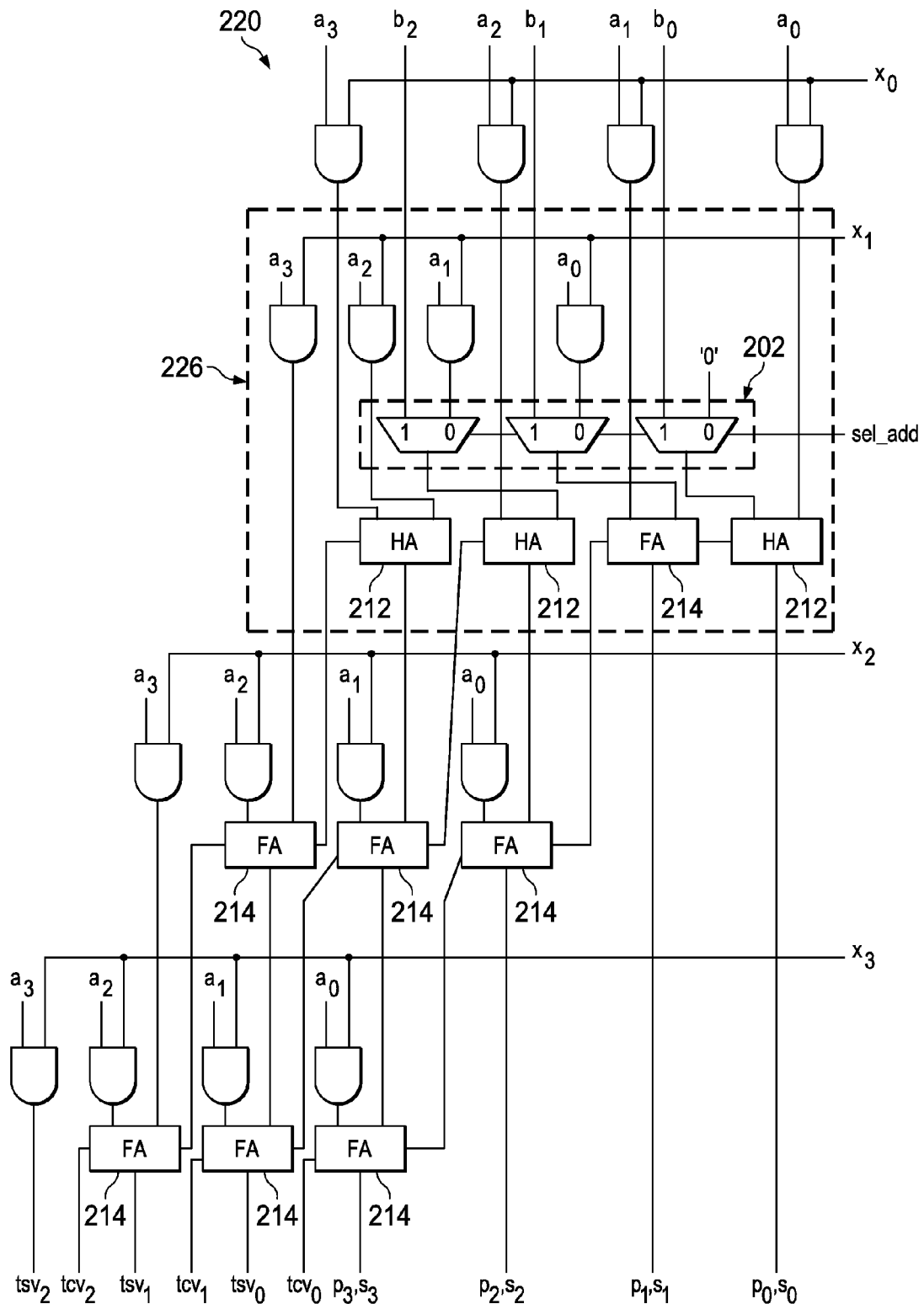

FIGS. 2A and 2B shows block diagrams of embodiments of multipliers that are applicable as multiplier 104. FIG. 2A shows a block diagram of the carry save array multiplier 200, which may employed as the multiplier 104 in the processor 100. While the multiplier 200 is shown as a 4 bit multiplier to promote clarity of explanation, the multiplier 200 may be expanded to multiply wider operands (e.g., to multiply 32 bit operands and provide 32 and 64 bit results) in accordance with the principles disclosed herein. The carry save array multiplier 200 includes a plurality of cascaded multiplication layers 204-210, each of which generates a partial product of the two input multiplicands, and adds the partial product of the layer to partial products generated in previous layers. Accordingly, the multiplier 200 includes four partial product generation layers 204-210, three of which include adders 212, 214. Similarly, a 32-bit embodiment of the multiplier 200 includes 32 partial product generation layers, 31 of which include adders.

The multiplier 200 multiplies operand values a and x to generate a product value p. In addition to the product value p, the multiplier 200 generates a temporary carry vector value tcv and a temporary sum vector value tsv that are used to generate a double precision product. In a conventional multiplier, a dedicated adder is included to sum the tcv and tsv values, where the sum forms the upper bits of the double precision product. The multiplier 200 includes no such dedicated adder. To sum the tcv and tsv values, the multiplier 200 can selectably function as an adder rather than a multiplier.

The multiplier 200 includes multiplexers 202 that selectably route one of addend b, presented at corresponding b inputs of the multiplier 200, and the partial product of the multiplier's first partial product generation layer 204 to the adders 212 of the second partial product generation layer 206. When the multiplier 200 is to operate as an adder (adding a+b), the sel_add input control of the multiplier 200 is asserted (to select addend b for presentation to adders 212), and the value of multiplicand x is set to binary value '0010.' The bit of the x multiplicand set to '1' causes the addend a to pass through the and gates of the second partial product layer 206 to be added to the value b passed through the multiplexers 202. Accordingly, if the processor 100 is executing a double precision multiplication, tcv and tsv are presented as a and b inputs to the multiplier 200, and the output s of the multiplier 200 produced by the summation of a and b is the upper portion of the double precision product. Thus, embodiments of the multiplier 200 provide double precision multiplication by using the multiplication array to selectably perform both multiplication and addition of operands input to the multiplier 200. Some embodiments of the multiplier 200 may include additional multiplexers to route the outputs p and s onto a set of shared signal lines.

FIG. 2B shows a block diagram of a carry save array multiplier 220, which may employed as the multiplier 104 in the processor 100. The multiplier 220 is similar to the multiplier 200 in many respects, and the description provided herein with regard to the multiplier 200 is generally applicable to the multiplier 220. Like the carry save array multiplier 200, the multiplier 220 includes multiplexers 202 that selectably route either an addend input or a partial product value to adders of the multiplier 220 that are coupled to the outputs of the multiplexers 202. Accordingly, as in the multiplier 200, the multiplier 220 can selectably generate a product output or a sum output.

The multiplier 220 differs from the multiplier 200 in that the product output p and the sum output s of the multiplier 220 share signal lines p/s. To facilitate the signal line sharing, in the second partial product generation layer 226 the multiplexers 202 are arranged to selectably route the outputs of the 'and' gates 222, 224 to the adders of the layer 226, and the adders include an additional full adder 214 not included in partial product generation layer 206 of the multiplier 200.

Figure 3:
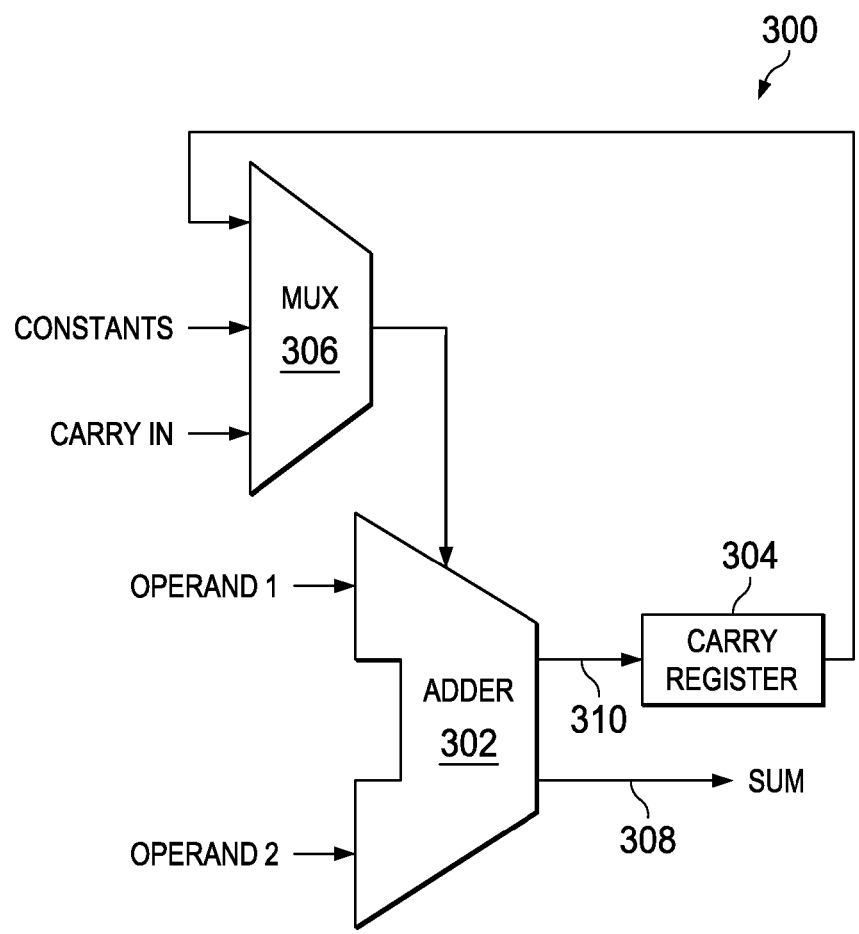
FIG. 3 shows a block diagram of an adder portion of an arithmetic logic unit in accordance with various embodiments.

FIG. 3 shows a block diagram of an adder portion 300 of the ALU 102 in accordance with various embodiments. The adder 300 includes a full adder 302, a carry register 304, and a carry multiplexer 306. The adder 300 allows the ALU 102 to be used for accumulation when the processor 100 is executing a MAC instruction. In the processor 100, execution of single or double precision MAC instruction triggers the multiplier 104 to perform the multiplication and triggers the ALU 102 to perform the accumulation. Accordingly, the processor 100 includes no dedicated adder for execution of MAC instructions.

In the adder 300, the full adder 302 adds the input operands 1 and 2 and a carry value provided by the carry multiplexer 306 to produce sum value 308 and carry out 310. The carry register 304 latches the carry out 310 allowing the carry out 310 to be presented to the fuller adder 302 via the multiplexer 306 during the next execution cycle. Thus, the adder 300 can execute a double precision accumulation in two adjacent execution cycles, where the accumulation is pipelined with the multiplication performed by the multiplier 104.

Figure 4:
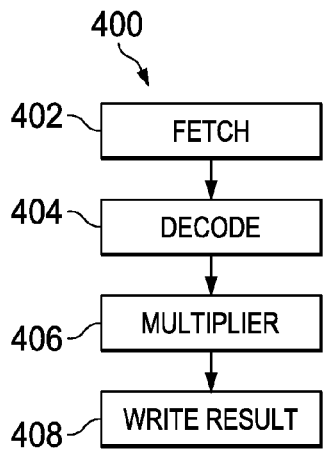
FIGS. 4-7 show instruction execution flows for multiply and multiply and accumulate instructions in a processor in accordance with various embodiments.

FIGS. 4-7 show instruction execution flows for multiplication and MAC instructions in the processor 100 in accordance with various embodiments. In FIG. 4, the flow 400 depicts the processor 100 executing a single precision multiplication instruction. The single precision multiply instruction may apply the multiplier 104 to execute a 32×32 multiplication that produces a 32-bit result. The blocks 402-408 of the flow 400 may represent pipelined operations.

In block 402, the processor 100 fetches the single precision multiplication instruction. For example, the processor 100 may fetch the multiplication instruction from a cache memory or other memory internal to or external to the processor 100.

In block 404, the processor 100 decodes the single precision multiply instruction. As a result of the decoding, the sequencing logic 108 may route operands to be multiplied from the registers 106 to the multiplier 104.

The multiplier 104 multiplies the input operands, in block 406, to produce a single precision result. In block 408, the single precision product generated by the multiplier 104 is stored in one of the registers 106.

Figure 5:
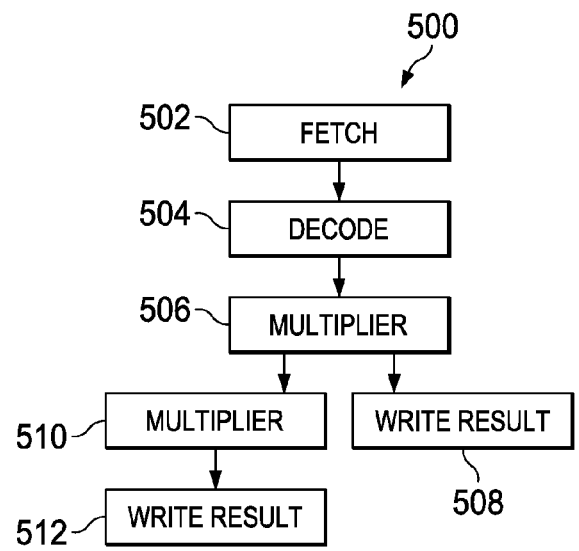

FIG. 5 shows a flow 500 depicting execution of a double precision multiplication instruction by the processor 100. The double precision multiply instruction may apply the multiplier 104 to execute a 32×32 multiplication that produces a 64-bit result. The blocks 502-510 of the flow 400 may represent pipelined operations.

In block 502, the processor 100 fetches the double precision multiplication instruction. For example, the processor 100 may fetch the multiplication instruction from a cache memory or other memory internal to or external to the processor 100.

In block 504, the processor 100 decodes the double precision multiply instruction. As a result of the decoding, the sequencing logic 108 may route operands to be multiplied from the registers 106 to the multiplier 104.

In block 506, the multiplier 104 multiplies the input operands to produce the lower half of the double precision product. The tcv and tsv values generated by the multiplication may be stored in registers for use in generating the upper portion of the double precision product.

In block 508, the lower half of the double precision product generated by the multiplier 104 is stored in one of the registers 106.

In block 510, in parallel with the writing of the lower half of the double precision result to a register 106, the sequencing logic 108 routes the tcv and tsv values, generated by the multiplier 104 during the multiplication of block 506, to the addend a and b inputs of the multiplier 104. The sequencing logic 108 sets the multiplier 104 to perform addition, rather than multiplication, by enabling the multiplexers 202 to select the b addend for input to the adders 212, and setting multiplicand x to pass the a addend to the adders 212. The multiplier 104 adds the tcv and tsv values to generate the upper portion of the double precision product.

In block 512, the upper half of the double precision product generated by the multiplier 104 is stored in one of the registers 106.

Figure 6:
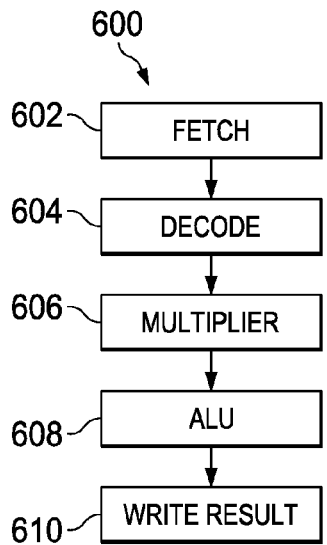

FIG. 6 shows a flow 600 depicting execution of a single precision MAC instruction by the processor 100. The single precision MAC instruction applies the multiplier 104 to execute a 32×32 multiplication that produces a 32-bit product. The ALU 102 adds the single precision product to a single precision accumulation value. The blocks 602-610 of the flow 600 may represent pipelined operations.

In block 602, the processor 100 fetches the single precision MAC instruction. For example, the processor 100 may fetch the MAC instruction from a cache memory or other memory internal to or external to the processor 100.

In block 604, the processor 100 decodes the single precision MAC instruction. As a result of the decoding, the sequencing logic 108 may route operands to be multiplied from the registers 106 to the multiplier 104.

In block 606, the multiplier 104 multiplies the input operands to produce a single precision result.

In block 608, the sequencing logic 108 routes the single precision product generated by the multiplier 104 to the ALU 102 and configures the ALU 102 to add the product to a stored accumulation value (e.g., stored in one of the registers 106). The ALU 102 adds the product to the stored accumulation value.

In block 610, the single precision sum generated by the ALU 102 is stored in one of the registers 106 as the updated accumulation value.

Figure 7:
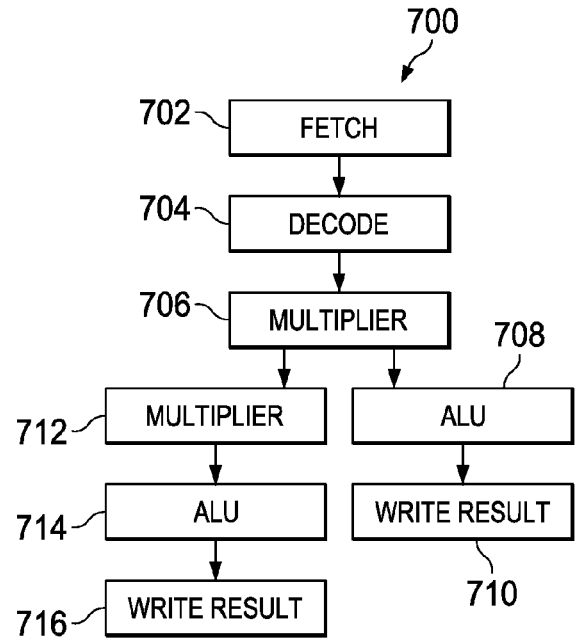

FIG. 7 shows a flow 700 depicting execution of a double precision MAC instruction by the processor 100. The double precision MAC instruction may apply the multiplier 104 to execute a 32×32 multiplication that produces a 64-bit result, and apply the ALU 102 to execute a 64-bit accumulation. The blocks 702-716 of the flow 700 may represent pipelined operations.

In block 702, the processor 100 fetches the double precision MAC instruction. For example, the processor 100 may fetch the MAC instruction from a cache memory or other memory internal to or external to the processor 100.

In block 704, the processor 100 decodes the double precision MAC instruction. As a result of the decoding, the sequencing logic 108 may route operands to be multiplied from the registers 106 to the multiplier 104.

In block 706, the multiplier 104 multiplies the input operands to produce the lower half of the double precision product. The tcv and tsv values generated by the multiplication may be stored in registers for use in generating the upper portion of the double precision product.

In block 708, the sequencing logic 108 routes the lower half of the double precision product generated by the multiplier 104 to the ALU 102 and configures the ALU 102 to add the product to the lower half of a stored double precision accumulation value (e.g., stored in one of the registers 106). The ALU 102 adds the product to the stored accumulation value. The carry value 310 generated by the addition is stored in the carry register 304 for feedback to the adder 302 in the next execution cycle.

In block 710, the result of the addition by the ALU 102 is stored in one of the registers 106 as the lower half of the double precision accumulation value.

In block 712, in parallel with the accumulation of the lower half of the product in the ALU 102 in block 708, the sequencing logic 108 routes the tcv and tsv values, generated by the multiplier 104 during the multiplication of block 706, to the addend a and b inputs of the multiplier 104. The sequencing logic 108 sets the multiplier 104 to perform addition, rather than multiplication, by enabling the multiplexers 202 to select the b addend for input to the adders 212, and setting multiplicand x to pass the a addend to the adders 212. The multiplier 104 adds the tcv and tsv values to generate the upper portion of the double precision product.

In block 714, in parallel with the writing of the lower half of the double precision accumulation to a register 106 in block 710, the sequencing logic 108 routes the upper half of the double precision product generated by the multiplier 104 to the ALU 102. The sequencing logic 108 configures the ALU 102 to add the upper portion of the product to the upper half of a stored double precision accumulation value (e.g., stored in one of the registers 106), and to the carry value stored in carry register 304. The ALU 102 adds the product, the stored accumulation value, and the carry value.

In block 716, the result of the addition is stored in one of the registers 106 as the upper half of the double precision accumulation value.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A processor, comprising:
a multiplier configured to multiply two operands;
an arithmetic logic unit configured to sum two operands; and
sequencing logic that controls operation of the multiplier and the arithmetic logic unit during instruction execution;
wherein the sequencing logic is configured to, as part of execution of a multiply and accumulate instruction:
add, in the arithmetic logic unit, a product value generated by the multiplier to a previous output of the arithmetic logic unit;
wherein the arithmetic logic unit includes a carry register configured to:
store a carry flag generated by addition in the arithmetic logic unit, and
provide the stored carry flag to the arithmetic logic unit for summation during execution of a double precision multiply and accumulate instruction;
wherein the multiplier is a carry save array multiplier comprising an array of cascaded partial product generators, configured to:
generate a first output value as a product of two operands presented at inputs of the multiplier; and
generate a second output value as a sum of two operands presented at inputs of the multiplier.

2. The processor of claim 1, wherein the multiplier is configured to selectably perform either of multiplication and addition of input operands.

3. The processor of claim 1, wherein the multiplier is configured, as part of a multiplication of two operands, to provide as output:
a first product value;
a temporary carry vector value; and
a temporary sum vector value; and
wherein the multiplier is further configured to, as part of a summation performed subsequent to the multiplication:
generate a second product value by adding the temporary carry vector value and the temporary sum vector value in the array of cascaded partial product generators;
wherein the second product value and the first product value combine to form an extended precision product of the two operands multiplied.

4. The processor of claim 3, wherein the multiplier is configured to set a multiplicand input of the multiplier to a predetermined value based on the carry save array multiplier being used to perform an addition.

5. The processor of claim 1, wherein the multiplier comprises a multiplexer configured to selectably provide one of an operand to be added and a partial product to a lowest order adder of the array of cascaded partial product generators.

* * * * *